(12) United States Patent
Piedmont et al.

(10) Patent No.: US 9,751,251 B2
(45) Date of Patent: Sep. 5, 2017

(54) VACUUM FORMING REGULATOR BAG

(71) Applicant: Lockheed Martin Corporation, Bethesda, MD (US)

(72) Inventors: Gregory Piedmont, Morro Bay, CA (US); Mike Malis, Stevenson Ranch, CA (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 608 days.

(21) Appl. No.: 14/313,931

(22) Filed: Jun. 24, 2014

(65) Prior Publication Data
US 2014/0306385 A1 Oct. 16, 2014

Related U.S. Application Data

(62) Division of application No. 13/084,903, filed on Apr. 12, 2011, now Pat. No. 8,795,574.

(51) Int. Cl.
*B29C 51/10* (2006.01)
*B29C 51/16* (2006.01)
*B65D 33/16* (2006.01)

(52) U.S. Cl.
CPC .............. *B29C 51/10* (2013.01); *B29C 51/16* (2013.01); *B65D 33/16* (2013.01); *B29C 2791/006* (2013.01)

(58) Field of Classification Search
CPC .......... B29C 51/10; B29C 51/16; B65D 33/16
See application file for complete search history.

(56) References Cited

U.S. PATENT DOCUMENTS

| 5,246,275 A | 9/1993 | Arredondo, Jr. |
| 5,622,733 A | 4/1997 | Asher |
| 2005/0053762 A1 | 3/2005 | Willden et al. |
| 2006/0249883 A1 | 11/2006 | Oguma et al. |
| 2008/0251969 A1 | 10/2008 | Isham et al. |
| 2009/0025448 A1 | 1/2009 | Krogager et al. |
| 2010/0139850 A1 | 6/2010 | Morris et al. |

FOREIGN PATENT DOCUMENTS

| GB | 2199790 A | 7/1988 |
| GB | 2334475 A | 8/1999 |
| JP | 6-344433 A | 12/1994 |
| JP | 2000-158528 A | 6/2000 |
| JP | 2010-540294 A | 12/2010 |
| WO | WO-2009/044194 A2 | 4/2009 |

OTHER PUBLICATIONS

Baker, et al., "Composite Materials for Aircraft Structures," 2004 American Institute of Aeronautics and Astronautics.

*Primary Examiner* — Joseph S Del Sole
*Assistant Examiner* — John Robitaille
(74) *Attorney, Agent, or Firm* — McDermitt Will & Emery LLP

(57) ABSTRACT

A vacuum-forming system for deforming a forming blank is disclosed. The system includes a tool and at least one regulator bag disposed adjacent to the tool. The regulator bag includes a sealed bag having an exterior and an interior and a first volume and a defined passage from the interior to the exterior of the regulator bag. The passage is configured such that the regulator bag has a rate of deflation wherein the sealed bag will deflate from the first volume to a second volume over a determined period of time while the exterior of the sealed bag is at a determined reduced pressure. The system also includes a vacuum membrane coupled to the tool, the membrane configured to form a vacuum space enclosing the forming blank and the at least one regulator bag.

10 Claims, 5 Drawing Sheets

VACUUM FORMING REGULATOR BAG

CROSS-REFERENCE TO RELATED APPLICATION

This application is a divisional application of U.S. patent application Ser. No. 13/084,903, filed Apr. 12, 2011, the entire contents of which are incorporated by reference herein for all purposes.

STATEMENT REGARDING FEDERALLY SPONSORED RESEARCH OR DEVELOPMENT

Not applicable.

BACKGROUND

Field

The present disclosure generally relates to vacuum forming and, in particular, controlling the deformation of a part during the vacuum forming process.

Description of the Related Art

Components made from fiber-reinforced composite material often use a lightweight core material covered with surface layers of the composite material. This construction can provide a high strength-to-weight ratio which is particularly advantageous in aerospace applications. Foam materials such as polystyrene, polyurethane, and polymethacrylimide are commonly used as cores, depending on the resins and operational requirements. Foams are available in a variety of densities, which vary with the compressive strength of the foam, and may be open-cell or closed-cell, depending on the material.

Some manufacturing techniques shape the foam core and then apply the composite materials to the core. Foam blanks are available in a variety of shapes and sizes, including sheets and blocks in thicknesses of a few millimeters up to 10 centimeters or more. A typical aerospace-grade foam is Rohacell® A (available from Evonik Röhm GmbH, Performance Polymers, 64293 Darmstadt, Germany) that can be formed after being heated to approximately 350 degrees Fahrenheit (F).

One drawback to thermoforming foam is that it is impractical to manually handle the material while the foam is at the working temperature. One existing method of thermoforming a foam blank around a tool is to place the blank over the tool and enclose the blank and the tool in a sealed bag, heat the tool and foam blank to the working temperature, and then create a vacuum within the bag. The external air pressure applies a uniformly distributed force that forms the foam around the tool. This is a delicate process, however, that is subject to a high degree of variability, and the rate of forming is sensitive to the vacuum level. It is not uncommon for the foam blank to crack during the forming process when the foam is formed too quickly.

SUMMARY

There is a need to provide a standardized and repeatable method of thermoforming foam blanks. The disclosed system and method provide a controlled method of thermoforming a foam blank that is repeatable and adjustable. A regulator bag is positioned inside the vacuum bag and under the foam blank. When the vacuum is first applied, the regulator bag supports the foam blank. The regulator bag is configured to slowly deflate thereby allowing the foam to slowly form around the tool.

In certain embodiments, a vacuum-forming system for deforming a forming blank is disclosed. The system includes a tool and at least one regulator bag disposed adjacent to the tool. The regulator bag includes a sealed bag having an exterior and an interior with a first volume and a defined passage from the interior to the exterior of the regulator bag. The passage is configured such that the regulator bag has a rate of deflation wherein the sealed bag will deflate from the first volume to a second volume over a determined period of time while the exterior of the sealed bag is at a determined reduced pressure. The system also includes a vacuum membrane coupled to the tool, the membrane configured to form a vacuum space enclosing the forming blank and the at least one regulator bag.

In certain embodiments, a regulator bag for use within the vacuum space of a forming process is disclosed. The regulator bag includes a sealed bag having an interior with a determined first volume and a defined passage from the interior to an exterior of the regulator bag, the passage configured such that the regulator bag has a rate of deflation wherein the sealed bag will deflate from the first volume to a second volume over a determined period of time while the exterior of the sealed bag is at a determined reduced pressure.

In certain embodiments, A method of regulating the deformation of a forming blank during a vacuum forming process is disclosed. The method includes the steps of placing at least one gas-filled regulator bag adjacent to a tool, the regulator bag comprising a defined passage from an interior having a first volume to an exterior, placing at least a portion of the forming blank adjacent to the regulator bag, enclosing the forming blank, the at least one regulator bag, and at least a portion of the tool with a vacuum membrane to form a vacuum space, and reducing the pressure within the vacuum space to a determined first pressure, thereby causing the regulator bag to deflate.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

The following description discloses embodiments of a vacuum-forming system configured to slowly and controllably form a foam blank about a tool. The system includes at least one regulator bag placed within the vacuum bag and positioned such that the bag support the foam blank. When a vacuum is created within the vacuum bag, the regulator bag slowly releases the air, or other gas such as nitrogen, that is inside the regulator bag into the vacuum space within the vacuum bag. As the regulator bag deflates, the foam blank slowly is formed around the tool by the external air pressure. As the rate of deflation of the bag is controlled by a defined passage from the interior to the exterior of the regulator bag, the rate of deflation and therefore the rate of forming is well controlled.

In the following detailed description, numerous specific details are set forth to provide a full understanding of the present disclosure. It will be apparent, however, to one ordinarily skilled in the art that embodiments of the present disclosure may be practiced without some of the specific details. In other instances, well-known structures and techniques have not been shown in detail so as not to obscure the disclosure.

The method and system disclosed herein are presented in terms of the forming a thermoformable foam blank into the shape of a half-cylinder. It will be obvious to those of ordinary skill in the art that this same configuration and method can be utilized in a variety of applications wherein a different foam is used, the foam is to be formed without heating, a non-foam core material is to be formed, and where the foam is formed in conjunction with the forming or additional elements of the final structure. Nothing in this disclosure should be interpreted, unless specifically stated as such, to limit the application of any method or system disclosed herein to a particular shape of the formed core, a particular, material, or a thermoforming process.

Figure 1A:
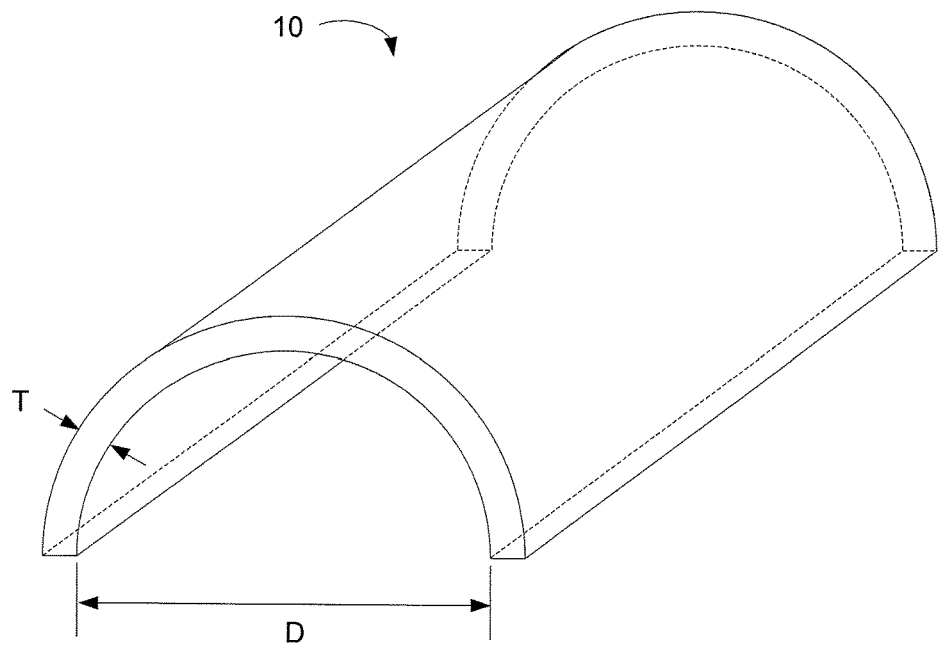
FIG. 1A is a perspective view of an exemplary formed foam core.

FIG. 1A is a perspective view of an exemplary formed foam core 10. This particular foam core 10 is a half-cylinder with a diameter D and a thickness T.

Figure 1B:
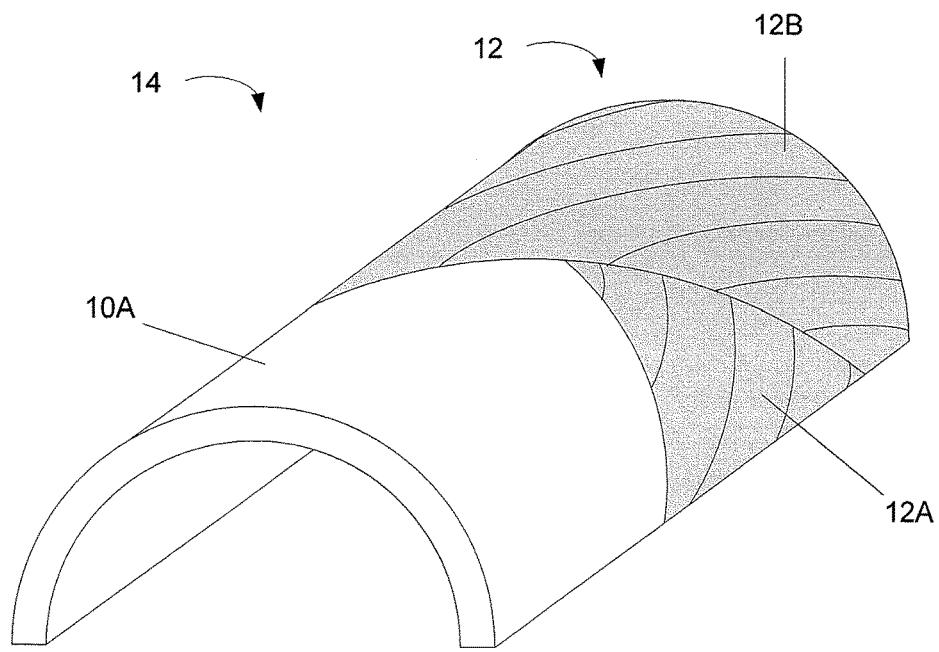
FIG. 1B is a perspective view of an exemplary composite structure that includes the formed foam core of FIG. 1A.

FIG. 1B is a perspective view of an exemplary composite structure 14 that includes the formed foam core 10 of FIG. 1A. A layer 12 of a fiber-reinforced plastic (FRP) with a reinforcing fiber and a precursor material that will cure into a matrix around the fibers, such as carbon-fiber-reinforced epoxy, has been overlaid on the external surface 10A of the foam core 10. Layer 12, in this example, includes two plys 12A and 12B of unidirectional continuous carbon-fiber-reinforced epoxy that are laid at an angle to each other and to the center axis of the cylindrical shape of foam core 10. In certain embodiments, the formed foam core 10 is placed over an inner tube of FRP (not shown) before the layer 12 is applied. In certain embodiments, the plys of layer 12 may include additional plys at other angles, plys of other types of fibers, or plys having cut fiber reinforcement. In certain embodiments, the layer 12 may be wound from a continuous tape (not shown) with reinforcing fibers and a matrix precursor.

Figure 2A:
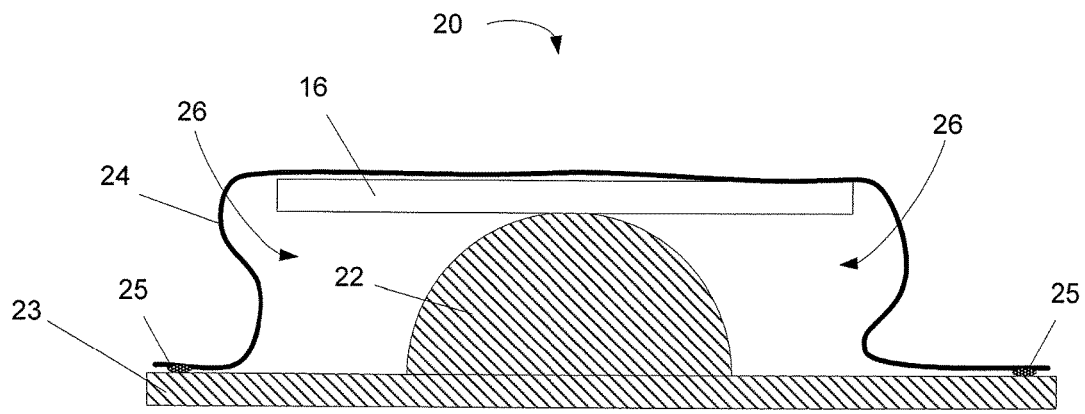
FIGS. 2A and 2B illustrate one of the problems associated with current thermoforming processes.
Figure 2B:
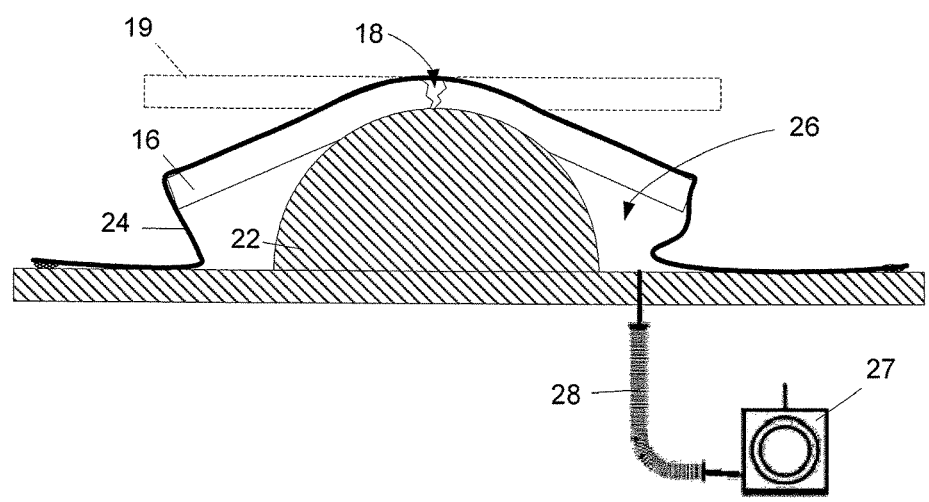

FIGS. 2A and 2B illustrate one of the problems associated with current thermoforming processes. In the current thermoforming apparatus 20 of FIG. 2A, a foam blank 16 has been placed over a tool 22 that is attached to a base plate 23. In certain embodiments, the tool 22 and base plate 23 are a single item. A vacuum bag 24 has been placed over the foam blank 16 and the tool 22 and sealed to the base plate 23, forming a vacuum space 26. In this example, vacuum bag 24 has been sealed to the base place 23 by a bead of a sealant 25 around the perimeter of the base plate 23.

FIG. 2B depicts one possible configuration of the apparatus of FIG. 2A after the thermoforming process has been started. A vacuum pump 27 was connected to the vacuum space 26 through vacuum line 28. As the pressure within the vacuum space 26 was reduced, pressure was applied to the foam blank 16 by the external atmosphere, where the applied force was a function of the differential between the ambient pressure and the reduced pressure in the vacuum space 26. The foam blank 16 began to deform around tool 22. Outline 19 is the original position and shape of foam blank 16, for reference. In this example, the applied force created sufficient stress in the foam blank 16 that the foam blank 16 ruptured at crack 18. In the current process, the reduced pressure in the vacuum space 26 is manually adjusted during the process to try and maintain the stress in the foam blank 16 below this point and avoid this breakage.

Figure 3A:
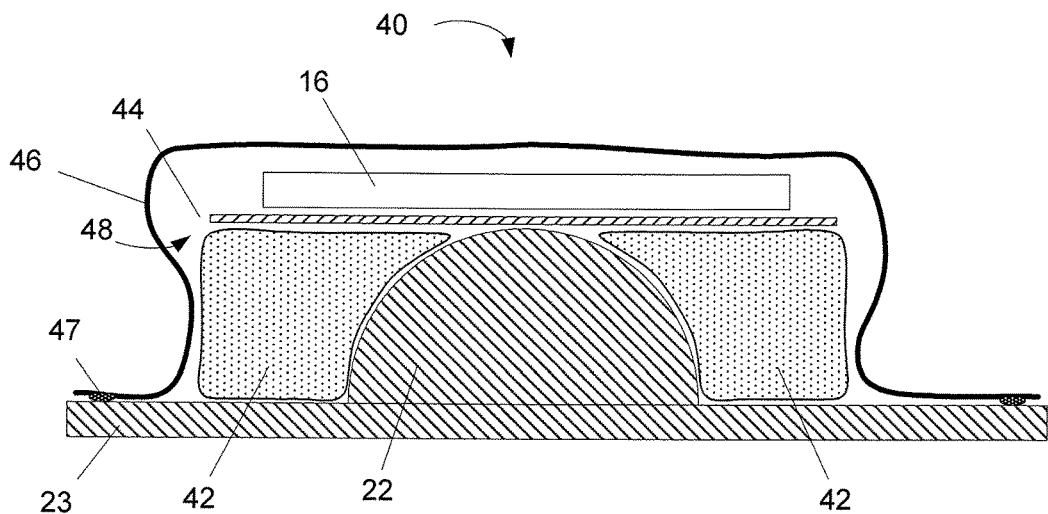
FIG. 3A depicts a vacuum forming system according to certain aspects of this disclosure.

FIG. 3A depicts a vacuum forming system 40 according to certain aspects of this disclosure. System 40 includes the same tool 22 and base plate 23 of apparatus 20 of FIG. 2A. In certain embodiments, tool 22 includes the base place 23. System 40 also includes, in this example, a pair of regulator bags 42 that are placed on each side of the tool 22 such that the regulator bags 42 support the foam blank 16. The regulator bags 42 have been inflated with sufficient pressure to expand the bags to support the foam blank 16. The regulator bags include a controlled leak that will allow the gas within the regulator bag 42 to slowly flow into the vacuum space 48. The regulator bags 42 are discussed on greater detail with respect to FIG. 4. A vacuum impermeable membrane 46 has been coupled to the base plate 23 through a sealant 47, the membrane 46 configured to form a vacuum space 48 enclosing the forming blank 16 and the regulator bags 42. In this example, a flexible support 44, such as a thin sheet of soft aluminum, that has been placed under the foam blank 16 and over the regulator bags 42 and the tool 22.

Figure 3B:
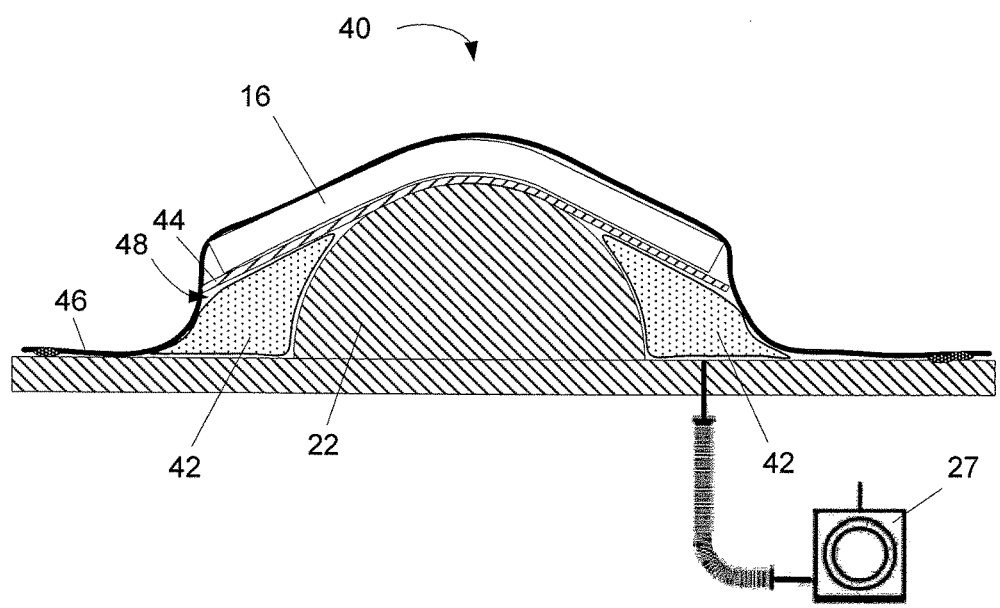
FIGS. 3B-3D depict a method of regulating the deformation of a forming blank according to certain aspects of this disclosure.
Figure 3C:
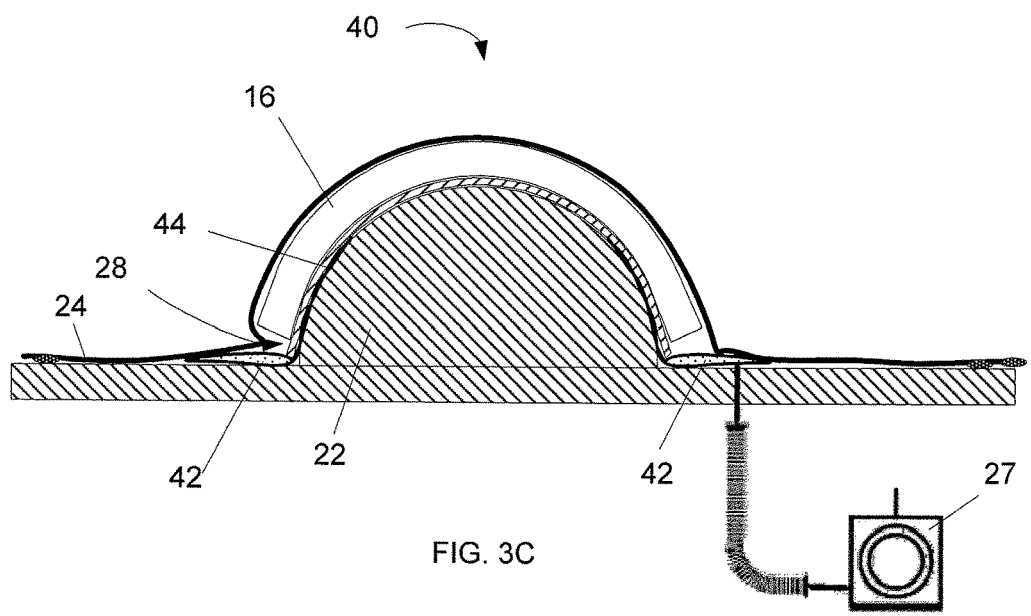
Figure 3D:
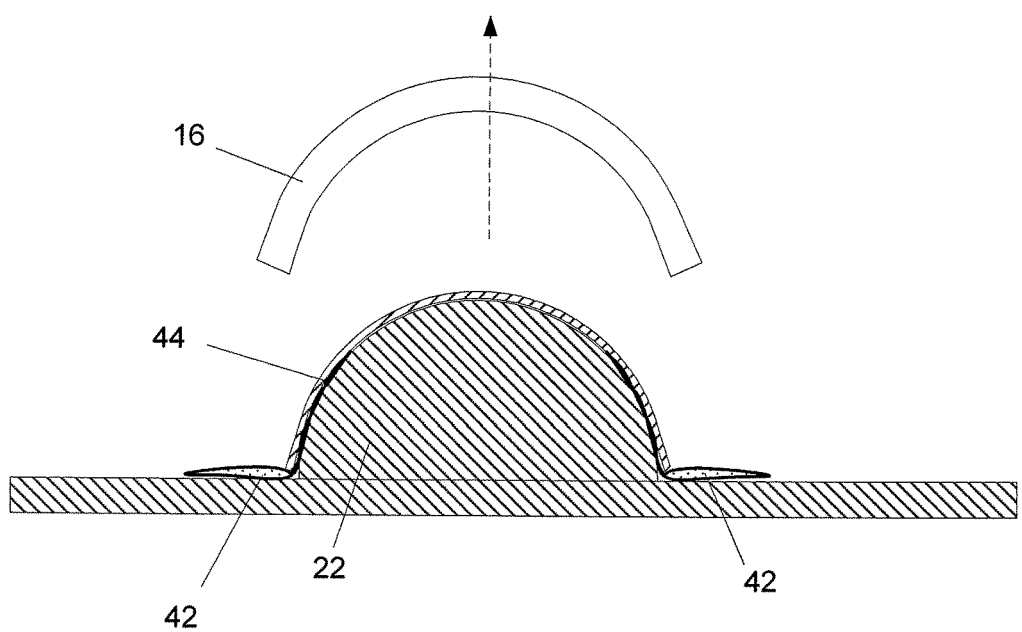

FIGS. 3B-3D depict a method of regulating the deformation of a forming blank 16 according to certain aspects of this disclosure. FIG. 3B depicts the vacuum forming system 40 of FIG. 4A after the pressure within the vacuum space 48 has been reduced using vacuum pump 27. The regulator bags 42 have partially deflated, allowing the pressure created by the ambient pressure on the foam bank 16 to deform the flexible support 44 and the foam blank 16 partially around the tool 22. The benefit of the regulator bags 42 is that the rate of deformation of the foam blank 16 is now controlled by the deflation rate of the regulator bags 42 and is not significantly affected by the exact reduced pressure, or amount of vacuum, within vacuum space 48. This is in contrast to the apparatus of FIGS. 2A and 2B, where the rate of deformation is solely dependent upon the amount of vacuum within the vacuum space 26. The deformation of the foam blank 16 is further controlled and improved by the presence of the flexible support 44, that stabilizes the support of the foam blank 16 by the regulator bags 42 and ensures an even deformation around the tool 22.

FIG. 3C depicts the vacuum forming system 40 after additional time has elapsed and the forming of the foam blank 16 is complete. The regulator bags 42 are fully deflated, i.e. have deflated to the point where further deflation will not affect the forming of the foam blank 16. The flexible support 44, in this example, conforms to the tool 22. The system 40 can now be cooled to a lower temperature.

FIG. 3D depicts the vacuum forming system 40 after the tool 22 and formed foam blank 16 have cooled sufficiently to be handled. In FIG. 3D, the membrane 46 has been removed and the formed foam blank 16 is being removed from the tool 22. The regulator bags 42 and flexible support 44 may be re-used or discarded.

Figure 4:
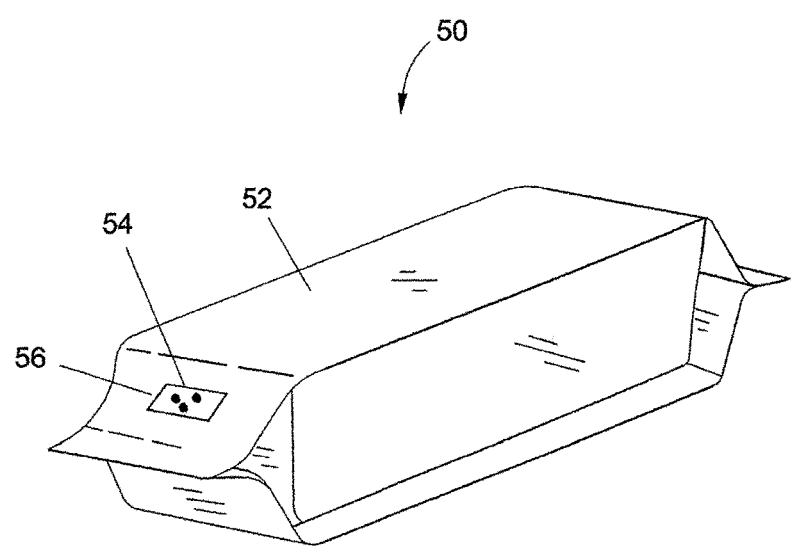
FIG. 4 depicts an exemplary regulator bag according to certain aspects of the disclosure.

FIG. 4 depicts an exemplary regulator bag 50 according to certain aspects of the disclosure. The regulator bag 50 is formed from a gas-impermeable membrane 52 that is folded and sealed to form a sealed bag having a volume. In certain embodiments, this sealing is accomplished through heat sealing the membrane 52 to itself. In certain embodiments, an adhesive (not shown) is used to seal the membrane 52 to itself. In certain embodiments, the membrane 52 is sealed to an additional element (not shown) to form an enclosed volume. In the embodiment of FIG. 4, the regulator bag includes a rigid element 54 that is attached to the membrane 52 having several passages 56 that pass through the rigid element 54 and the membrane 52. The number and size of the passages 56 are selected to control the rate of deflation of the regulator bag 50 when exposed to a reduced pressure. In certain embodiments, the rigid element 54 is omitted and the passages 56 are formed directly in the membrane 52. In certain embodiments, a gas valve (not shown) is included in place of the passages 56 to provide a controlled rate of deflation. In certain embodiments, the gas valve is adjustable to control the rate of deflation of the regulator bag 50. In certain embodiments, a portion of the regulator bag 50 is formed from a gas-permeable material (not shown). In certain embodiments, the permeability of the gas-permeable portion of the regulator bag provides the gas flow that allows the regulator bag to deflate.

It will be apparent to one of ordinary skill in the art that a regulator bag may be formed in a variety of shapes and sizes to accommodate specific forming operations and from a variety of materials. In addition, it will be apparent that other methods of providing a controlled rate of deflation of the regulator bag when exposed to a vacuum, including venting of the regulator bag to a separate chamber at a determined reduced pressure or to ambient pressure.

The concepts disclosed herein provide a system and method for controllably deforming an article, such as a foam blank, in a vacuum-forming operation. The use of one or more regulator bags within the vacuum space allow the rate of deformation to be controlled with a reduced sensitivity to the level of vacuum created within the vacuum space, resulting in a more repeatable forming process and reducing the incidence of damage to the formed parts during the vacuum-forming.

The previous description is provided to enable a person of ordinary skill in the art to practice the various aspects described herein. While the foregoing has described what are considered to be the best mode and/or other examples, it is understood that various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the terms "a set" and "some" refer to one or more. Pronouns in the masculine (e.g., his) include the feminine and neuter gender (e.g., her and its) and vice versa. Headings and subheadings, if any, are used for convenience only and do not limit the invention.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method of regulating deformation of a forming blank during a vacuum forming process, the method comprising the steps of:
   placing at least one gas-filled regulator bag adjacent to a tool, the regulator bag comprising a defined passage from an interior having a first volume to an exterior;
   placing at least a portion of the forming blank adjacent to the regulator bag;
   enclosing the forming blank, the at least one regulator bag, and at least a portion of the tool with a vacuum membrane to form a vacuum space; and
   reducing pressure within the vacuum space to a determined first pressure, thereby causing the regulator bag to deflate.

2. The method of claim 1, further comprising the steps of:
   placing a flexible support over the regulator bag;
   wherein the step of placing at least a portion of the forming blank adjacent to the regulator bag comprises placing the forming blank at least partially on the flexible support.

3. The method of claim 1, further comprising the step of:
   maintaining the first pressure within the vacuum space until the regulator bag has deflated to a determined second volume.

4. The method of claim 1, further comprising the step of:
   heating the forming blank to a determined first temperature.

5. The method of claim 4, wherein the forming blank is heated to the first temperature before reducing the pressure within the vacuum space.

6. The method of claim 4, further comprising the step of:
    cooling the forming blank to a determined second temperature after the regulator bag has deflated to a determined second volume.

7. The method of claim 3, further comprising the step of:
    changing the pressure within the vacuum space to a second pressure after the regulator bag has deflated to a determined third volume.

8. The method of claim 7, wherein the third volume is greater than the second volume.

9. The method of claim 1, further comprising the step of:
    holding the first pressure within the vacuum space until the forming blank is fully formed.

10. The method of claim 1, wherein the forming blank comprises a foam material.

\* \* \* \* \*